United States Patent [19]
Weng

[11] Patent Number: 5,702,632
[45] Date of Patent: Dec. 30, 1997

[54] NON-CFC REFRIGERANT MIXTURE

[75] Inventor: Chuan Weng, Asheville, N.C.

[73] Assignee: General Signal Corporation, Stamford, Conn.

[21] Appl. No.: 697,477

[22] Filed: Aug. 26, 1996

Related U.S. Application Data

[63] Continuation of Ser. No. 380,353, Jan. 30, 1995, abandoned, which is a continuation of Ser. No. 201,696, Feb. 25, 1994, Pat. No. 5,408,848.

[51] Int. Cl.$^6$ ............................................. C09K 5/04
[52] U.S. Cl. ............................................. 252/67; 62/114
[58] Field of Search ............................. 252/67; 62/114

[56] References Cited

U.S. PATENT DOCUMENTS

| | | | |
|---|---|---|---|
| 4,459,810 | 7/1984 | Enjo et al. | 252/67 |
| 4,810,403 | 3/1989 | Bivens et al. | 252/67 |
| 4,850,199 | 7/1989 | DiNovo et al. | 62/114 |
| 4,983,312 | 1/1991 | Tamura et al. | 252/67 |
| 5,237,828 | 8/1993 | Kutsuna | 62/114 |
| 5,254,280 | 10/1993 | Thomas et al. | 252/68 |
| 5,265,443 | 11/1993 | Yuzawa et al. | 62/114 |

FOREIGN PATENT DOCUMENTS

| | | |
|---|---|---|
| 0558823 | 9/1993 | European Pat. Off. |
| 527467 | 9/1976 | U.S.S.R. |
| 1084283 | 4/1984 | U.S.S.R. |

*Primary Examiner*—Christine Skane
*Attorney, Agent, or Firm*—Ohlandt, Greeley, Ruggiero & Perle

[57] ABSTRACT

A refrigeration heat exchanger section useful in circulating a substantially non-CFC refrigerant mixture which comprises: a compressor means, an auxiliary condenser, a first condenser, a second condenser, a third condenser, a subcooler and a liquid/gas separator, wherein a subcooled refrigerant liquid mixture taken as bottoms from the liquid/gas separator is distributed and expanded by a first expansion means and a second expansion means to form first and second expanded streams, respectively, such that the first expanded stream is returned to the auxiliary condenser and compressor in order to avoid overheating of the compressor.

2 Claims, 6 Drawing Sheets

NON-CFC REFRIGERANT MIXTURE

This is a continuation of application Ser. No. 08/380,353, filed Jan. 30, 1995, now abandoned, which is a continuation of application Ser. No. 08/201,696, filed on Feb. 25, 1994 now U.S. Pat. No. 5,408,848.

The present invention generally relates to ultra-low temperature and cyrogenic preservative refrigeration systems and, more particularly, relates to a refrigeration system which is capable of using substantially non-CFC refrigerants without causing the compressor to overheat.

BACKGROUND OF THE INVENTION

Ultra-low and cryogenic temperatures ranging from −95° C. to −150° C. have been achieved in refrigeration systems using a single circuit vapor compressor. These systems typically use a single compressor to pump a mixture of four or five CFC containing refrigerants to reach an evaporative temperature of as low as −160° C.

Environmental concern over the depletion of the ozone-sphere has increased pressure on refrigerator manufacturers to substantially reduce the level of CFC-containing refrigerants used within their systems. Although non-CFC refrigerant mixtures have been developed, it has been discovered that most of these refrigerant mixtures cannot simply be substituted for CFC-containing refrigerants in currently available refrigeration systems due to the different thermodynamic properties of the refrigerants.

The present inventor has discovered that using non-CFC refrigerants in conventional ultra-low and cryogenic temperature systems cause an imbalanced flow of the refrigerants in the refrigeration circuit, which reduces the cooling capability of the refrigerants to the compressor. Such low levels of compressor cooling can cause a system to fail due to compressor overheating.

Therefore, the present inventor has developed a novel autocascade ultra-low and cryogenic temperature refrigeration system which is capable of operating with non-CFC refrigerant mixtures. These non-CFC refrigerant mixtures are non-toxic, chemically stable, commercially available and compatible with most of the standard refrigeration oils and compressor materials. Normally, only one component of the non-CFC refrigerant mixture, i.e., hydrochloroflurocarbon (HCFC), is a regulated ozone depleting chemical. As such, the refrigerant mixture typically exhibits an overall ozone depletion factor (ODP) of only 0.06.

Unlike the CFC-containing refrigeration systems which do not cause overheating of the compressor, the present inventor has discovered that the substantially non-CFC refrigeration systems must provide additional liquid return to the compressor in order to avoid overheating thereof and eventual failure of the system.

The present inventor has been able to overcome the overheating of the compressor when using substantially non-CFC refrigerants in a single compressor autocascade system. This is accomplished by providing a specially-designed capillary tube or expansion means disposed downstream of the first liquid/gas separator such that liquid refrigerants are returned directly to the auxiliary condenser and then to the compressor. This feature enables larger than normal quantities of refrigerants of higher boiling points to be rapidly returned to the compressor, which results in excellent operating conditions of the compressor and avoids overheating thereof.

As such, the overall performance of the non-CFC autocascade system is comparable to its counterpart of the CFC autocascade system. This is evidenced by the fact that both systems have similar pull down rates and compressor operating conditions at standard 90° F. ambient.

The present invention also provides many additional advantages which shall become apparent as described below.

SUMMARY OF THE INVENTION

A refrigeration heat exchanger section which is capable of circulating a substantially non-CFC refrigerant mixture which comprises: a compressor means, an auxiliary condenser, a first condenser, a second condenser, a third condenser, a subcooler means and a liquid/gas separator, wherein the improvement is characterized by: a means for distributing a subcooled refrigerant liquid mixture from the liquid/gas separator to a first expansion means and a second expansion means for forming first and second expanded streams, respectively; and a first conduit means for returning the first expanded stream to the auxiliary condenser and the compressor; and a second conduit means for delivering the second expanded stream to the first condenser.

More specifically, the refrigeration heat exchanger section preferably comprises: a compressor means; an auxiliary condenser connected to receive and cool the refrigerant mixture discharged from the compressor means; a first liquid/gas separator connected to received the cooled refrigerant mixture discharged from the auxiliary condenser, wherein a subcooled refrigerant liquid mixture is taken as bottoms and a gaseous refrigerant liquid mixture is taken overhead; a means for distributing the subcooled refrigerant liquid mixture to a first expansion means and a second expansion means to form a first expanded stream and a second expanded stream, respectively; a first conduit means for returning the first expanded stream to the auxiliary condenser and the compressor.

The high pressure flow of the heat exchanger circuit further comprises: a first condenser connected to receive the gaseous refrigerant mixture from the liquid/gas separator; a second liquid/gas separator connected to receive the gaseous refrigerant mixture from the first condenser, wherein a subcooled liquid refrigerant mixture is taken as bottoms and a gaseous refrigerant mixture is taken overhead; a second condenser connected to receive the gaseous refrigerant mixture which is taken overhead from the second liquid/gas separator; a third condenser connected to receive at least a portion of the gaseous refrigerant mixture taken from the second condenser; and a subcooler means connected to receive the gaseous refrigerant mixture from the third condenser.

The low pressure flow of the heat exchanger circuit further comprises: a distributor means connected to receive the refrigerant mixture from the subcooler means, the distributor means is capable of separating the refrigerant mixture into a first stream and a second stream; a third expansion means connected to receive the first stream, thereby forming a third expanded stream; a third conduit means for delivering the third expanded stream to the subcooler means; a fourth expansion means connected to received the second stream, thereby forming a fourth expanded stream; a fourth conduit means for delivering the fourth expanded stream to a storage tank; a fifth conduit means for delivering the fourth expanded stream from the storage tank to the third condenser; a sixth conduit means disposed between the third condenser and the second condenser such that the fourth expanded stream from the third condenser is delivered to the second conduit means; a sixth expansion means connected to receive the subcooled liquid refrigerant mixture from the second liquid/gas separator, thereby forming a fifth expanded stream; a seventh conduit means for delivering the fifth expanded stream to the second condenser; an eighth conduit means for delivering the fifth expanded stream from the second condenser to the first condenser; a second conduit means for delivering the second expanded stream to the first condenser; a ninth conduit means for delivering the second expanded stream and the fifth expanded stream from the first condenser to the auxiliary condenser; and a tenth conduit means for delivering the first, second and fifth expanded streams from the auxiliary condenser to the compressor.

Other and further objects, advantages and features of the present invention will be understood by reference to the following specification in conjunction with the annexed drawings, wherein like parts have been given like numbers.

DESCRIPTION OF THE PREFERRED EMBODIMENTS

Figure 1:
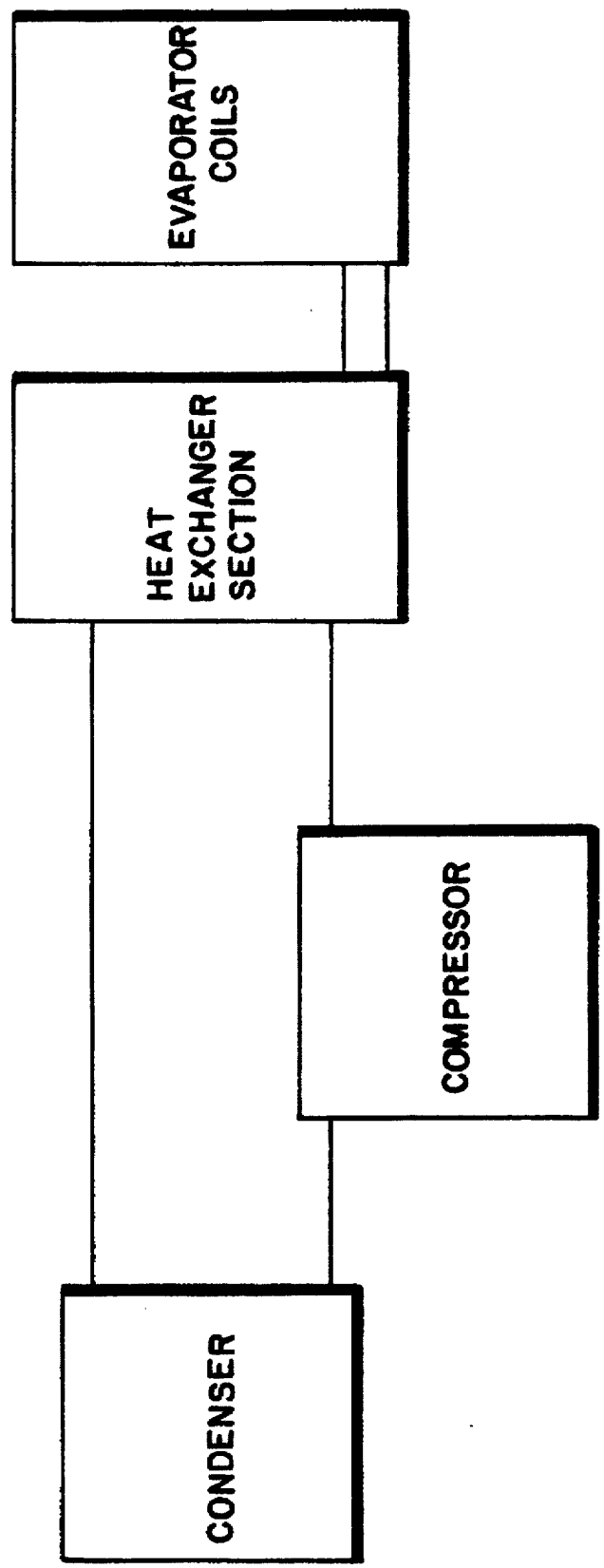
FIG. 1 is a block diagram of the single compressor refrigeration system according to the present invention.

Single compressor ultra-low and cryogenic temperature refrigeration systems, as shown in FIG. 1, pump refrigerants through a condenser, heat exchanger section and evaporator coils in a closed circuit loop to provide temperatures as low as −150° C. The heat exchanger section and evaporator coils referred to in FIG. 1 are specifically described in FIG. 2. The conventional refrigeration compressor and condenser referred to in FIG. 1 are not shown in FIG. 2. The air-cooled condenser cools the compressor and removes BTU's from the refrigerant by partially changing the refrigerant mixture from vapor to liquid, whereas the liquid/gas separator separates liquid refrigerant from vapor and returns lubricating oil to the compressor. The heat exchangers use the thermophysical properties of the refrigerants to effect the cooling process. The evaporator coils permit the flow of refrigerant at ultra-low temperatures to absorb heat from the freezer interior, delivering this heat to the condenser for removal.

The typical non-CFC refrigerant used with this system is R-142b (chlorodifluoroethane, $CH_3CClF_2$), R-134a (1,1,1, 2-tetrafluoroethane, $CF_3CH_2F$), R-23 (trifluoromethane, $CHF_3$), R-14 (carbon tetrafluoride, $CF_4$), and R-740 (argon, Ar). A typical charge composition by mass for −150° C. non-CFC autocascade system is 25.5% of R-142b, 23.2% of R-134a, 12.8% of R-23, 23.7% of R-14, and 14.8% of argon. The −95° C. systems use a similar heat exchanger configuration, with the difference that the refrigerant charge does not have the argon content.

Figure 2:
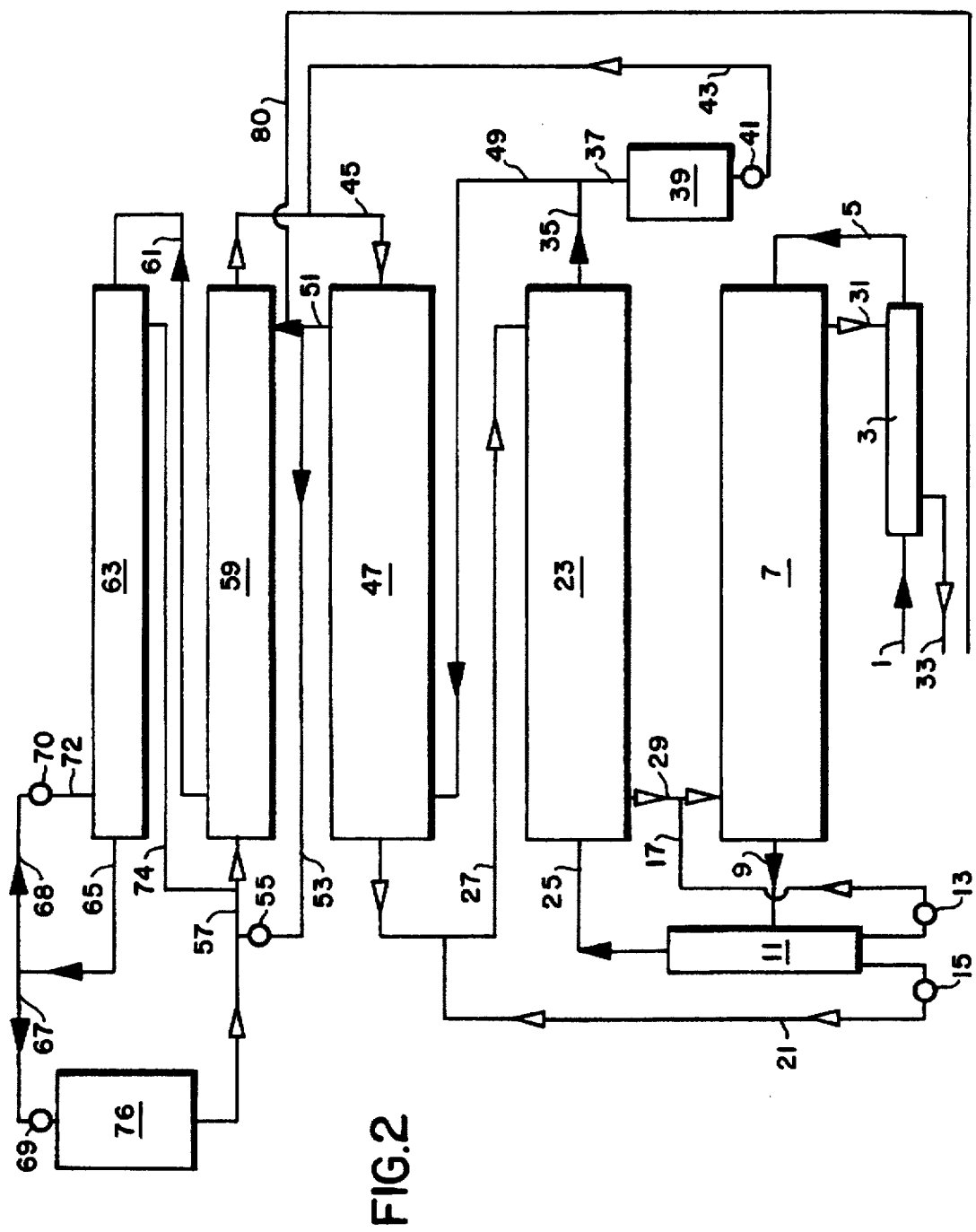
FIG. 2 is a non-CFC autocascade heat exchanger section according to the present invention.

FIG. 2 is a schematic diagram for a −150° C. non-CFC autocascade heat exchanger section, wherein a mixture of non-CFC refrigerant is pumped from liquid line 1 taken from the condenser shown in FIG. 1 through liquid/suction heat exchanger 3 to produce a mixture of gases and liquids at 225 psi and room temperature. This liquid/gas mixture is then pumped through auxiliary condenser 7 via conduit 5 and exits therefrom via conduit 9. After flowing through auxiliary condenser 7 the liquid/gas mixture reaches a temperature of approximately −10° F. At −10° F. and a pressure of about 220 psi, refrigerants R-142b, R-134a and R-23 become subcooled liquids, and sink to the bottoms of a vertically-mounted liquid/gas separator 11. The subcooled liquid mixture is then distributed and expanded by two capillary tube 13 and 15. The expanded liquid flows from capillary tube 13 and 15 to conduits 17 and 21, respectively, to join the return flow of low pressure refrigerant fluids.

Meanwhile, R-14 and argon gases, along with traces of the other refrigerants of higher boiling points, continue to flow through the tube side of first condenser 23 via conduit 25. The temperature of the R-14 and argon gases after passing through first condenser 23 is approximately −67° F. The traces of R-23 are subcooled to a liquid phase after passing through first condenser 23 such that it passes from conduits 35 and 37 into liquid/gas separator 39. Liquid R-23 and some gases are expanded by capillary tube 41 and pumped via conduits 43 and 45 to the tube side of second condenser 47. After passing through second condenser 47, the liquid R-23 is mixed in conduit 27 with the expanded mixture from conduit 21 and returned to the shell side of first condenser 23.

The R-14 and argon gas exiting first condenser 23 via conduit 35 are pumped via conduit 49 to the shell side of second condenser 47, exiting therefrom via conduit 51 at a typical temperature of −130° F. This temperature and the high side pressure of 215 psig allow a portion of the R-14 to be subcooled and sent via conduit 53 to capillary tube 55 where it is expanded and pumped via conduit 57 to cool the tube side of third condenser 59. However, a majority of the R-14 and argon gases are passed through the shell side of third condenser 59 to conduit 61 and into the tube side of subcooler 63. Most of the R-14 and argon gases exit subcooler 63 via conduit 65 at a temperature of −220° F. These gases are distributed via conduits 67 and 68 to capillary tube 69 and 70, respectively, where they are expanded to achieve a final temperature of −260° F. The expanded R-14 and argon gases from capillary tube 70 enter the shell side of subcooler 63 via conduit 72 to cool the gases passing through the tube side of subcooler 63. These gases then exit subcooler 63 via conduit 74 and are joined in conduit 57 with the expanded gases contained in reservoir or storage tank 76 (i.e., this constitutes the evaporator coils of FIG. 1) and expanded gases from capillary tube 55 before passing through the tube side of third condenser 59.

A portion of the R-14 and argon gases which exit second condenser 47 via conduit 51 are diverted via conduit 80 to an expansion tank section (not shown) as needed to prevent overpressure of the system during pull down and heavy loading situations.

Contemporaneously, the expanded liquid from capillary tube 15 is plumped via conduit 21 to conduit 27 wherein it flows to the shell side of first condenser 23. The shell side liquid of first condenser 23 is then merged with the expanded liquid from conduit 17 in conduit 29 and sent to the shell side of auxiliary condenser 7. The expanded liquid from conduit 29 exits auxiliary condenser 7 via conduit 31 and passes along the shell side of liquid/suction heat exchanger 3 where it is sent via suction line 33 to a single compressor (i.e., shown in FIG. 1). The compressor referred to in FIG. 1 compresses the expanded liquid and delivers the compressed liquid the condenser of FIG. 1 so as to complete the closed loop circuit of FIG. 1. The use of capillary tube 13 allows liquid phase refrigerants R-142a and R-134a to continue the journey of evaporation within auxiliary condenser 7 and liquid/suction heat exchanger 3, giving an appropriate return condition to prevent the compressor (not shown) from overheating. Simultaneously, capillary tube 15 will dispatch enough liquid for the cooling of first condenser 23. The use of an additional capillary tube 13 to return refrigerants R-142b and R-134a to the compressor accommodates the different thermodynamic properties of the non-CFC refrigerants. Otherwise, sufficient liquid refrigerants would not be returned to the compressor to avoid overheating, thereby causing failure of the refrigeration system.

Figure 3:
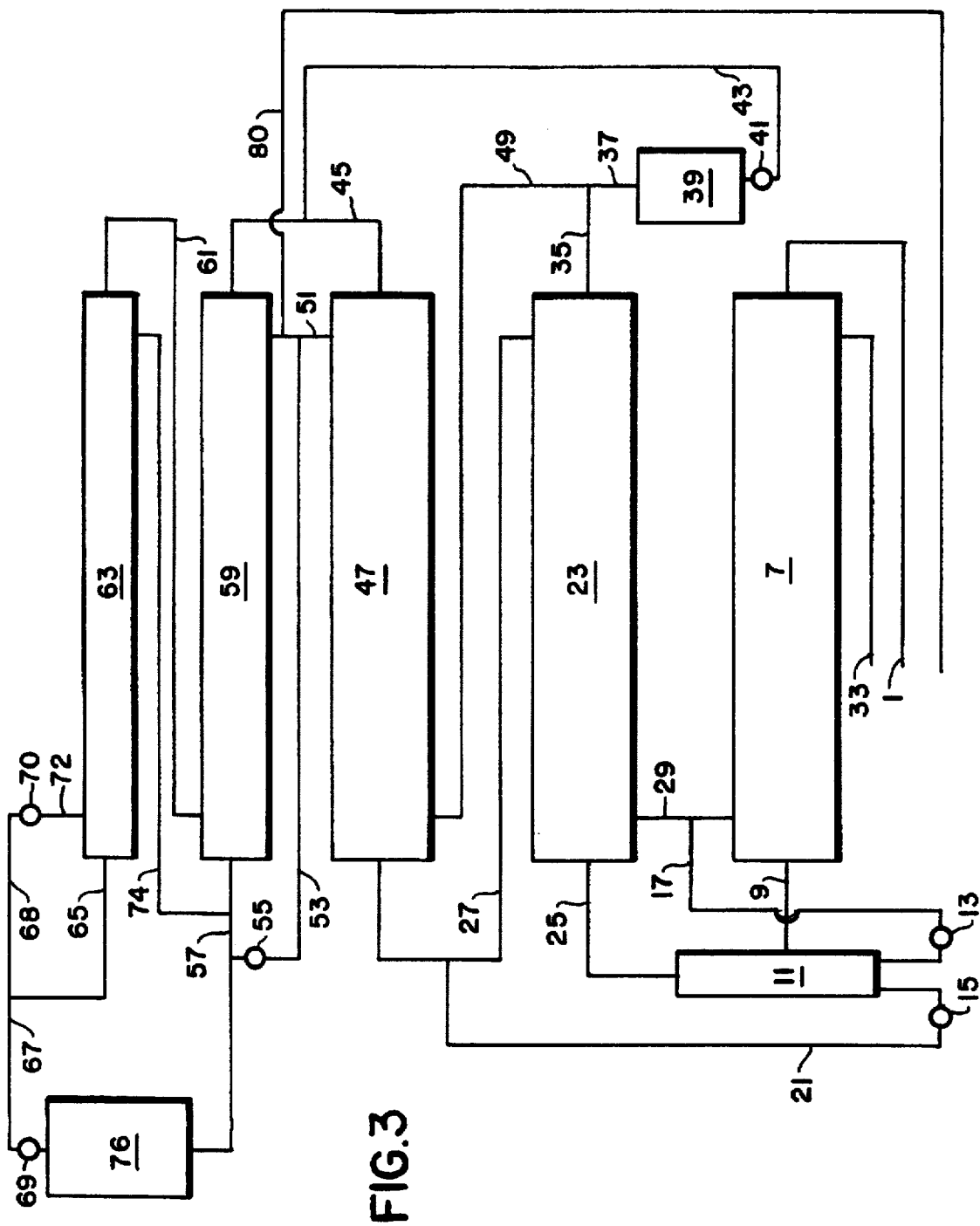
FIG. 3 is a non-CFC autocascade heat exchanger section in accordance with another embodiment of the present invention.

FIG. 3 is a schematic diagram for a −95° C. and −120° C. non-CFC autocascade heat exchanger section. This is similar to the heat exchange configuration of the −150° C. non-CFC system, except that the refrigerant charges do not include argon in −95° C. models and have less argon gas in −120° C. models. The warmer temperatures of these models make it possible to avoid the expense of a liquid/suction heat exchanger disposed about suction line 33 and liquid line 1.

Figure 4:
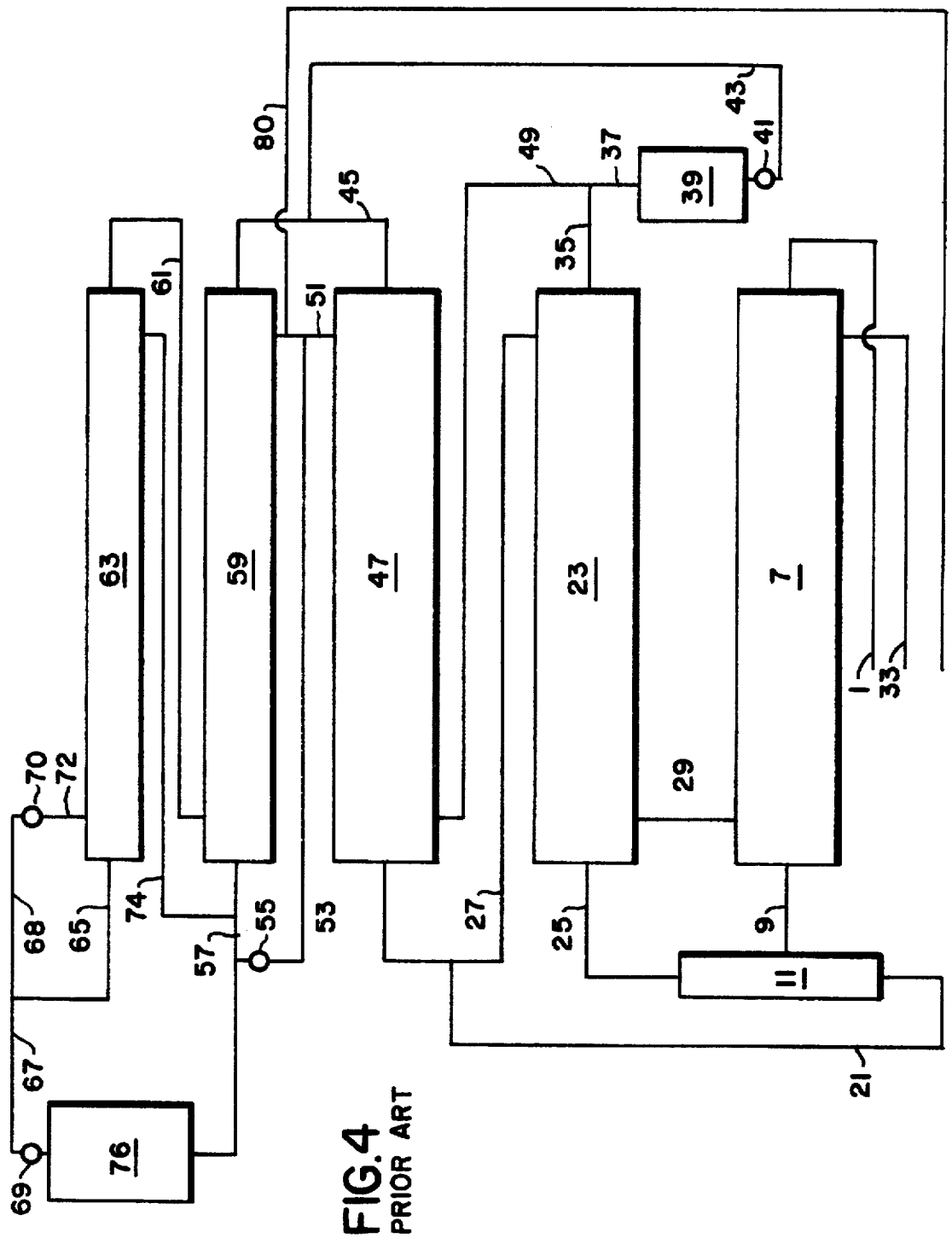
FIG. 4 is a conventional CFC-based autocascade heat exchanger section.

FIG. 4 depicts a conventional CFC-autocascade heat exchanger section which is similar to the non-CFC systems shown in FIGS. 2 and 3, except that the subcooled liquid from liquid/gas separator 11 is only distributed and expanded via one capillary tube to the shell side of the first condenser for cooling of the first condenser, second condenser and the compressor. As such, the conventional CFC system of FIG. 4 would cause the compressor to overheat, if used with the non-CFC refrigerants, and eventually result in a system failure.

Conversely, if a CFC refrigerant is added to the non-CFC autocascade refrigeration systems according to the present invention, then the thermodynamic operation of the system would be completely disrupted by returning too much liquid to the auxiliary condenser and thus causing the compressor to be flooded and eventual failure of the compressor.

Figure 5:
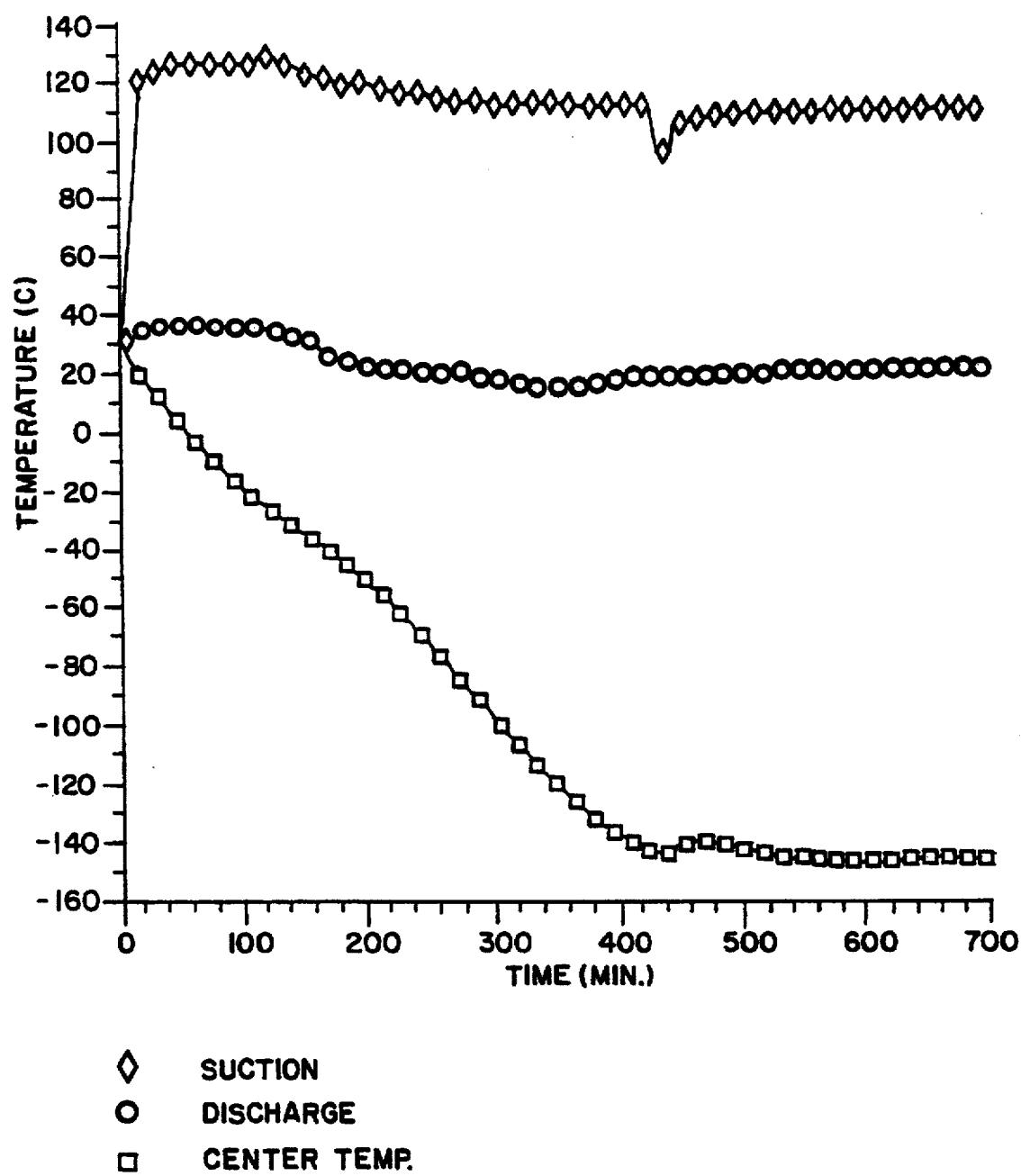
FIG. 5 is a graph depicting the pull down rates of CFC refrigerants in a conventional autocascade system at 90° F. ambient.
Figure 6:
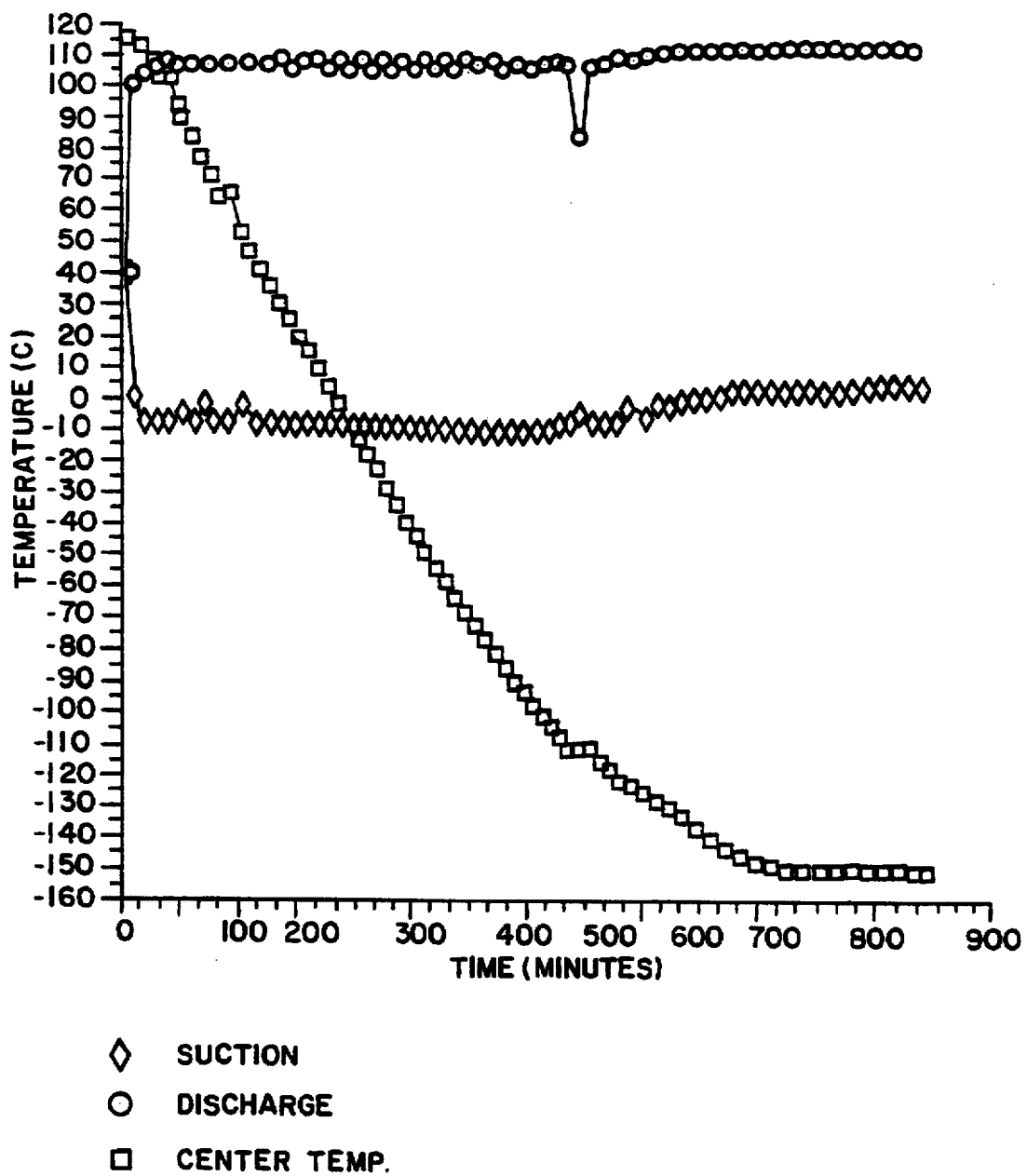
FIG. 6 is a graph depicting the pull down rates of non-CFC refrigerants in an autocascade system according to the present invention at 90° F. ambient.

FIGS. 5 and 6 clearly show that the pull down rates at 90° F. ambient are similar for both the conventional CFC autocascade system and the non-CFC autocascade system according to the present invention. For example, both systems exhibit a pull down rate at discharge after 600 minutes of about 0.192° C./min. The suction pull down rate after 600 minutes is about 0.033° C./min. for the CFC system and about 0.008° C./min. for the non-CFC system. Finally, the pull down rate at the center temperature after 600 minutes is about 0.24° C./min. for both systems.

It should be noted that the lower temperatures at suction, as exhibited in the non-CFC system, are highly desirable since these lower temperatures assist in the cooling of the compressor.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A refrigerant mixture for use in a refrigeration system capable of providing temperatures as low as about −150° C. consisting of:

1-chloro-1,1-difluoroethane;

1,1,1,2-tetrafluoroethane;

a trifluoromethane;

a carbon tetrafluoride; and argon.

2. The refrigerant mixture according to claim 1 wherein said chlorodifluoroethane is present in an amount of about 25.5 weight %, said 1,1,1,2-tetrafluoroethane is present in an amount of about 23.2 weight %, said trifluoromethane is present in an amount of about 12.8 weight %, said carbon tetrafluoride is present in an amount of about 23.7 weight %, and said argon is present in an amount of about 14.8 weight %.

* * * * *